DISCRETE BISTABLE DIGITAL MEMORY SYSTEM

Filed May 16, 1966 3 Sheets-Sheet 1

INVENTORS
ARTHUR R. FURMAN
HAROLD R. GREENE
FREDERICK A. WILHELM JR.
BY Allan Ratner
ATTORNEY INVENTORS
ARTHUR R. FURMAN
HAROLD R. GREENE
BY FREDERICK A. WILHELM JR.
Allan Ratner
ATTORNEY Dec. 9, 1969 A. R. FURMAN ET AL 3,483,530

DISCRETE BISTABLE DIGITAL MEMORY SYSTEM

Filed May 16, 1966 3 Sheets-Sheet 3

INVENTORS
ARTHUR R. FURMAN
HAROLD R. GREENE
FREDERICK A. WILHELM JR.
BY Allan Ratner
ATTORNEY United States Patent Office 3,483,530

Patented Dec. 9, 1969

3,483,530

DISCRETE BISTABLE DIGITAL MEMORY SYSTEM

Arthur R. Furman, Middletown, Harold R. Greene, New Shrewsbury, and Frederick A. Wilhelm, Jr., Eatontown, N.J., assignors to Electronics Associates, Inc., Long Branch, N.J., a corporation of New Jersey Filed May 16, 1966, Ser. No. 550,367

Int. Cl. G11b 5/74

U.S. Cl. 340—173 6 Claims

ABSTRACT OF THE DISCLOSURE

A digital memory system is disclosed having in each memory cell, a bistable circuit controlled by switching transistors. A select line is connected between the switching transistors and a source of driving signal to control the switching transistors of a selected cell. Potentials produced at the switching transistors are applied to read out data lines. Information may be written in via the data lines by producing a reference signal on one of the lines to control the state of associated memory cell.

This invention relates to storing binary information and more particularly to a memory system utilizing memory cells of the integrated circuitry type.

A high degree of speed and versatility can be achieved in a digital computer by utilizing a main large volume control memory and at least one small volume memory in the form of a "scratch pad." This scratch pad memory is usually designed to operate much more rapidly than the main memory and has as its principal purpose to speed up the response of the computer system to multiple inputs.

The memory cells making up the scratch pad memory may comprise individual electronic circuits of the flip-flop type. As well understood, flip-flop circuits may include at least one pair of cross-connected transistors having two stable states and which may be triggered from one stable state to the other of the stable states upon application of a triggering signal.

While such prior scratch pad memories utilizing such circuitry for the memory cells have significantly improved computer performance, they left much to be desired as a result of greatly increased cost. Specifically, each of the flip-flop memory cells has required many circuit components and a complex circuit design. As a result, reliability was not at a high level. In addition, such prior scratch pad memories did not lend themselves to utilization of integrated circuits as memory cells.

Accordingly, an object of the present invention is a scratch pad memory system utilizing as its memory cells flip-flop circuits of simple and highly reliable construction.

Another object of the present invention is a scratch pad memory system utilizing integrated circuits of simple design as its memory cells.

In one form of the present invention there is provided a scratch pad memory system in which the memory cells are arranged in columns and rows and each memory cell comprises a pair of cross-connected transistors having a first and a second stable state. Each of the memory cells includes a first switching transistor having its collector directly connected to a first of the cross connected transistors and a second switching transistor having its collector directly connected to a second of the cross-connected transistors. A select line is associated with each row of memory cells. Each select line is connected to the bases of the first and second switching transistors of the cells in the corresponding row. A driver applies only to one select line at any one time, a forward biasing signal to turn on the switching transistors of the corresponding cells. A plurality of pairs of data lines are provided with each pair associated with a different column of cells and in each column a first switching transistor of each cell is connected to a first of an associated pair of data lines and a second switching transistor is connected to the second of the associated pair of data lines. In this manner, the potentials produced at the respective cross-connected transistors are applied to the associated data lines, thereby to read out the cell information on the data lines. In addition, information may be written through the data lines by producing a reference signal at one line only of each pair of data lines to switch the stable state of the cell associated with the data lines and a selected group.

In this manner, there is achieved a scratch pad memory system utilizing flip-flop circuits of simple and highly reliable construction. In a preferred form the flip-flop circuit and the first and second switching transistors may be formed as one intergated circuit. In addition, a plurality of flip-flop circuits and switching transistors together with necessary inter-connections may be formed on one intergrated circuit.

For further objects and advantages of the invention and for a description of its operation, reference is to be had to the following detailed description taken in conjunction with the accompanying drawings in which.

Figure 1:
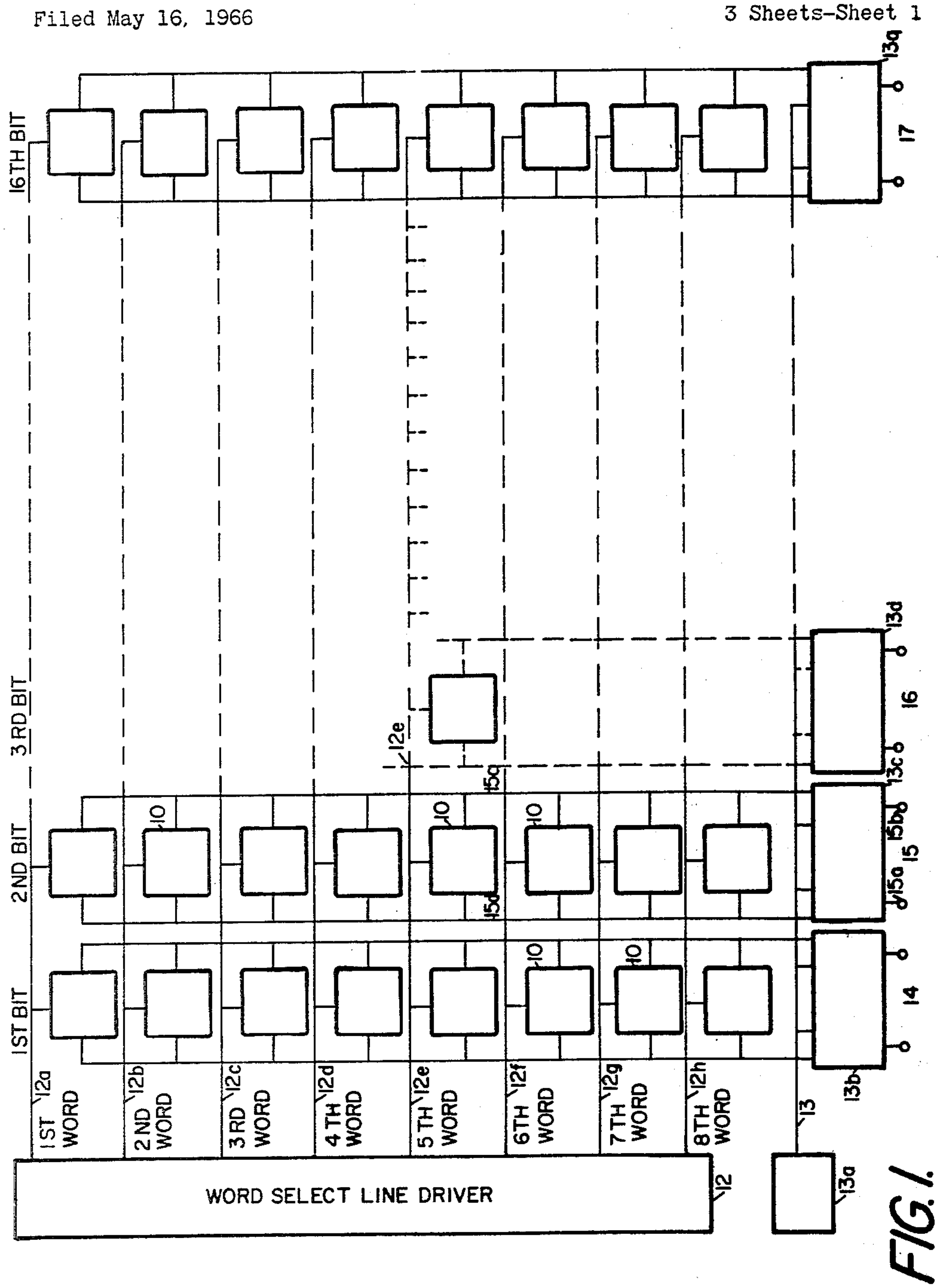
FIG. 1 illustrates in block diagram a scratch pad memory system embodying the invention.

Referring now to FIG. 1 there is shown a scratch pad memory system having eight words with sixteen bits in a word. In the illustrated embodiment a memory cell 10 is associated with each bit of each word. For purposes of illustration only memory cells 10 have been shown associated with each of the first bits of the eight words and with each of the second bits of the eight words. It will be understood that memory cells 10 are in practice associated with each of the bit positions of each of the words for a total of sixteen cells for each word. A word select line 12*a*–12*h* is associated with a differing one of the eight words and only one of the word select lines is actuated at any one time by a driver 12 to select the memory cells of a particular word to write in or read out data. The data is written in and read out from the memory cells of selected words by means of pairs of data lines 14–17. It will be understood that there is provided a pair of data lines for each of the sixteen bits though only four pairs of lines have been illustrated for clarity.

For the purpose of this explanation, it will be assumed that a 0-state or a logic "low" corresponds to zero volts or "ground" potential and a 1-state or logic "high" corresponds to a positive potential with respect to ground.

Each of the memory cells 10 of a word has a connection to the word select line corresponding to that word. For example, each of the memory cells 10 associated with the fifth word has a connection to the word select line 12*e*. In addition, each of the memory cells corresponding to each of the bits have connections to the data lines corresponding to that bit. For example, the memory cells 10 corresponding to the second bit of each word have connections to data lines 15. The data lines are controlled by respective read control circuits 13*b*–13*q* all connected to a write command line 13. Accordingly when line 13 is low and a particular word select line is high, then the memory cells corresponding to that word may be read out on the respective data lines. On the other hand, when line 13 is high and a particular word select line is high, then data may be written into the memory cells corresponding to that word. For example, when line 13 is low and word select line 12*e* is high or in a 1-state then data may be read out of the memory cells 10 associated with the fifth word. On the other hand, when line 13 is high and select line 12*e* is also high then data may be read into the memory cells corresponding to the fifth word.

Figure 2:
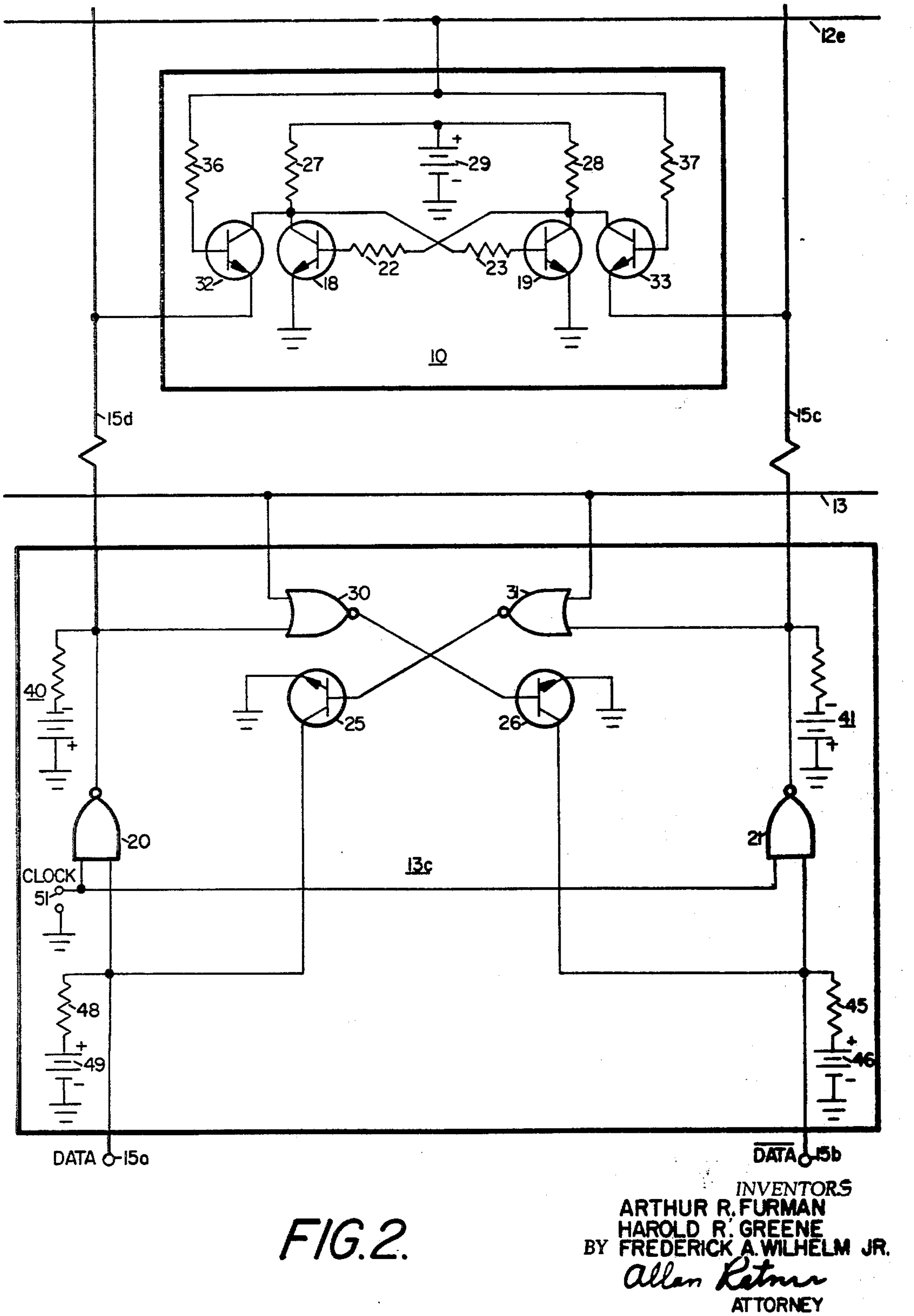
FIG. 2 illustrates some of the circuits shown in the system of FIG. 1.

Referring now to FIG. 2, there is shown a memory cell 10 located in FIG. 1 in the second bit of the fifth word. The operation of this memory cell and the manner in which data is written in and read out will be explanatory of the operation of all of the memory cells 10 in FIG. 1 without the necessity of describing each in detail.

It will be understood that memory cell 10 may be an integrated circuit of the direct coupled type comprising a pair of cross-connected transistor elements 18 and 19. In addition one integrated circuit may include a plurality of cells. Specifically, the collector of transistor 19 is directly connected by way of a resistor 22 to the base of transistor 18. In similar manner, the collector of transistor 18 is directly connected by way of a resistor 23 to the base of transistor 19. Both transistors 18 and 19 are switching transistor elements of the NPN type, each having their emitters grounded. Both of the collectors of transistors 18 and 19 are connected by way of respective collector resistors 27 and 28, to the positive side of a battery 29, the negative side of which is connected to ground.

As well understood by those skilled in the art, the direct cross-connected transistors 18 and 19 operate as a bistable circuit having a first stable state with transistor 18 conductive and transistor 19 non-conductive and having a second stable state in which transistor 19 is conductive and transistor 18 is non-conductive. A pair of switching transistors 32 and 33 are connected to the bistable device with transistor 32 having its collector directly connected to the collector of transistor 18 while the collector of transistor 33 is directly connected to the collector of cross-connected transistor 19. The bases of transistors 32 and 33 are connected by way of respective resistors 36 and 37 to the word select line 12*e*.

In operation, it will be assumed that memory cell 10, FIG. 2, is in a first of its stable states (1-state) in which transistor 18 is conductive or turned on and transistor 19 is non-conductive or turned off. In order to read out this 1-state of memory cell 10 a logic high or 1-state signal is applied to the word select line 12*e* which is common to all of the memory cells of the fifth word. This logic high is applied to the bases of switching transistors 32 and 33 which is effective to saturate and turn on these transistors as their emitters are connected to negative biasing circuits 40 and 41 respectively. As a readout is desired, a logic low is applied to the write command line 13 which indicates that a read out is taking place and not a write in.

With transistor 19 turned off, its collector is high and therefore, the collector of switching transistor 33 is also high. Accordingly, with transistor 33 turned on the high potential at its collector and base is applied to data line 15*c*, thereby bringing that line to a high or 1-state.

On the other hand, with transistor 18 conductive, its collector is at ground potential or at a low so that the collector of switching transistor 32 is also low. Since transistor 32 is turned ON its base and emitter are forced to a logic low by its collector thereby applying that logic low to data line 15*d*.

Thus, it will now be understood with cell 10 in a 1-state in which transistor 19 is turned off and transistor 18 is turned on, that data line 15*c* is high and data line 15*d* is low.

It will be remembered that in order to read out the 1-state of the cell 10 that the word select line 12*e* is high and the write command line 13 is low. The low signal on write command line 13 is applied to one input of each of NOR circuits 30 and 31 of read control circuit 13*b*. The outputs of NOR circuits 30 and 31 are respectively applied to the bases of read switching transistors 26 and 25. Transistors 26 and 25 are of the NPN type having their emitters connected to ground and their collectors connected by way of resistors to respective positive supplies. Specifically, switching transistor 26 has its collector connected by way of a supply resistor 45 to the positive side of a battery 46. In addition, the collector of transistor 26 is connected to terminal 15*b* which is the complementary data output ($\overline{\text{DATA}}$). Similarly, the collector of switching transistor 25 is connected to data output terminal 15*a* (DATA) and by way of a load resistor 48 to the positive side of a supply battery 49.

As previously described, a low signal is applied to each of the NOR circuits 30 and 31 which has the effect of enabling these circuits. However, with cell 10 in a 1-state, line 15*c* is high which is applied to the other input of NOR circuit 31 thereby to produce a low output from that circuit to the base of transistor 25. A low or ground potential applied to the base of transistor 25 has the effect of turning off that transistor. With transistor 25 off, its collector is high so that data terminal 15*a* is high, which indicates that cell 10 is in a 1-state.

On the other hand, with cell 10 being in a 1-state, line 15*d* is low, which is applied to the other input of NOR circuit 30. Thus circuit 30 produces a high output which is applied to the base of transistor 26, thereby turning on that transistor. In this manner, the collector of transistor 26 is low, producing a low output at complementary data output 15*b*, which indicates that cell 10 is in a 1-state. It will now be understood in accordance with the invention with cell 10 being in a 1-state and line 12*e* being high and write command line 13 being low, that a high output is produced in terminal 15*a* while a low output is produced at terminal 15*b*.

The foregoing explanation applies equally well if cell 10 is in a 0-state; that is, if transistor 19 is turned on and transistor 18 is turned off. Thus, in the readout condition with line 12*e* being high and line 13 being low, it will be understood that data line 15*c* is low since the collector of conductive transistor 19 is low. On the other hand, data line 15*d* is high since the collector of non-conductive transistor 18 is high. Thus, NOR circuit 31 produces a high output to turn on transistor 25 to produce a low output on data terminal 15*a* indicating cell 10 in a 0-state. On the other hand, the output of NOR 30 will be low and transistor 26 will be turned off so that terminal 15*d* of complementary data output is high indicating cell 10 is in a 0-state.

In order to read in or write in information into cell 10, the same data lines 15*c* and 15*d* of FIG. 2 are utilized. Accordingly, in order to write in information into the memory cells of the fifth word, a logic high is applied to conductor 12*e* only and a logic high is applied to the write command line 13. With a high signal on line 13, it will be understood that NOR circuits 30 and 31 are effectively disabled and transistors 25 and 26 are turned off.

If it is desired to write in a 1-state into data lines 15 thereby to switch cell 10 to a 1-state, a high input is applied to data terminal 15*a* and a low signal is applied to complementary data terminal 15*b*. It will also be assumed that upon write-in, cell 10 has previously been set to a 0-state—that is, transistor 19 is on and transistor 18 off.

Figure 3:
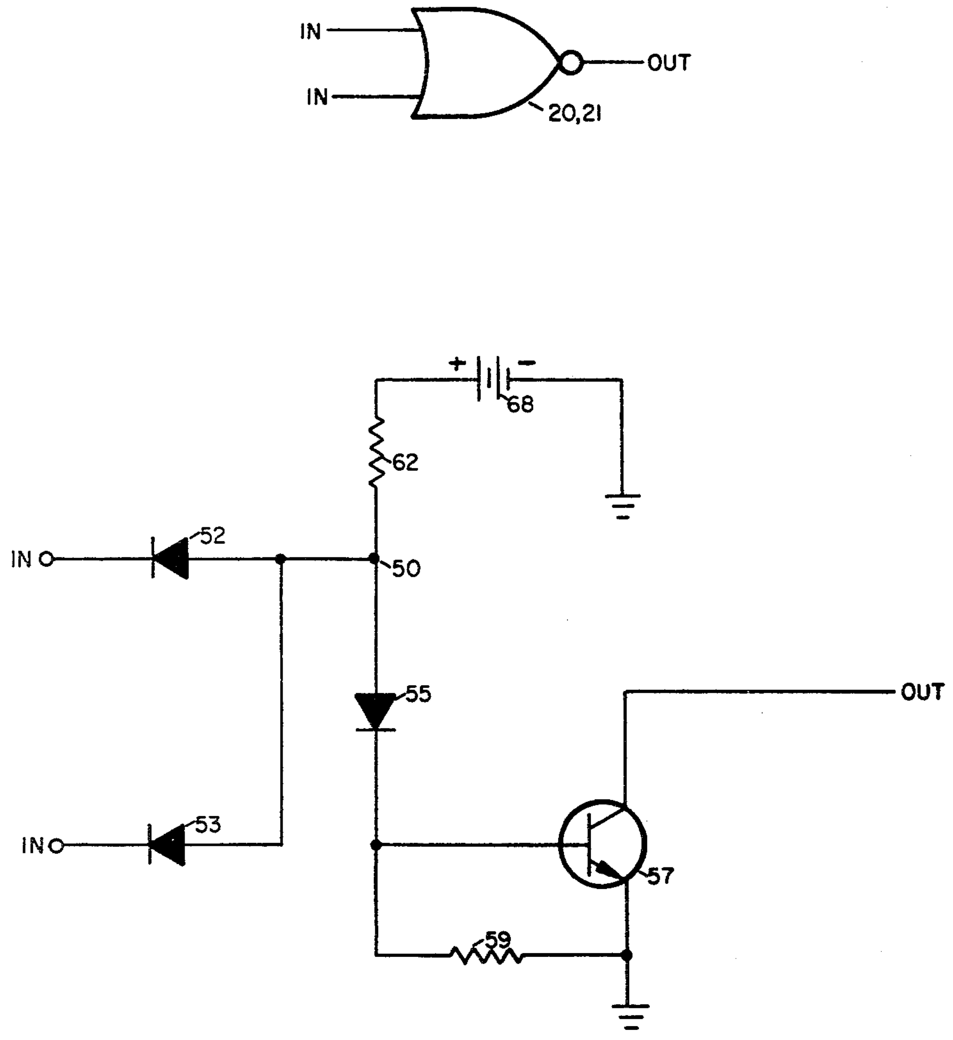
FIG. 3 illustrates a NAND gate shown in block diagram form in FIG. 2.

It will be remembered that with cell 10 in a 0-state and the word select line 12*e* being high that data line 15*d* is high and data line 15*c* is low. These data lines 15*c* and 15*d* are connected respectively to outputs of NAND gates 21 and 20. Gates 20 and 21 each have one input connected to a source of clock signals 51. The other input of NAND gate 20 is connected to data terminal 15*a* while the other input of NAND gate 21 is connected to complementary data terminal 15*b*. The internal circuitry of each of NAND gates 20 and 21 is shown in detail in FIG. 3. The two input gate terminals are connected by way of respective diodes 52 and 53 to a junction 50. Junction 50 is connected by way of a third diode 55 to the base of an NPN transistor 57, the emitter of which is connected to ground and by way of a biasing resistor 59 to the base.

In the above example, it has been assumed that terminal 15*a* is high thereby turning off diode 53 of NAND gate 20. In addition, during the time of the clock pulse, diode 52 is turned off. Therefore, in NAND gate 20 current flow may be traced by way of a positive supply battery 68 through a resistor 62, junction 50, diode 55 and through the base emitter junction of transistor 57 to ground. In this manner, transistor 57 of gate 20 is turned on and line 15*d* is forced to a logic low approaching ground potential. On the other hand, with data terminal 15*b* being low, during the time of the clock pulse while diode 52 of gate 21 is turned off, diode 53 is turned on. In this manner, current flow may be traced from the battery 68 through diode 53 to the low complementary data terminal 15*b*. Thus transistor 57 is maintained turned off. Thus, it will now be understood that upon write in of a 1-state, viz, a 1-state signal to terminal 15*a* and a 0-state signal to terminal 15*b*, line 15*d* is forced low while line 15*c* is connected to a non-conductive transistor 57 of gate 21.

With line 15*d* being forced low, this forward biases the base to emitter junction of transistor 32 since its base is at a high potential resulting from the high on line 12*e*. Thus, a low or ground potential is applied to the collector of non-conductive transistor 18 thereby switching the state of flip-flop 10. Thus, transistor 18 is turned on and transistor 19 is turned off indicating a 1-state for cell 10. When the cell 10 switches line 15*c* is changeed from a low to a high and is unaffected since as previously described, line 15*c* is connected to non-conductive transistor 57 of gate 21.

Thus, in accordance with the invention cell 10 previously in a 0-state, is selected by line 12*e* and a 1-state is written in. It will be understood that no change would have been made to cell 10 if a 0-state had been written in since line 15*c* would have been forced low thereby applying ground potential to the already grounded conductive transistor 19. It will also be understood that a 0-state may be written into cell 10 if cell 10 is in a 1-state. Specifically, line 15*c* is forced low thereby applying a reference or ground potential to non-conductive transistor 19 thereby switching the flip-flop to a 0-state.

It will now be understood that in accordance with the invention data may be written in or read out of cell 10 through the emitter of each of transistors 32 and 33 as long as base of each transistor is forward biased. Transistors 32 and 33 are also utilized to read out the state of cell 10 through the collectors when the bases of these transistors are forward biased. Thus, in an integrated circuit by utilizing a pair of switching transistors 32 and 33 directly connected to the flip-flop transistors 18 and 19, data may be read out of the cell 10 and read into the cell by emergization of a word select line. More particularly, write in information is applied to the emitters of transistors 32 and 33 while read out information is applied to the collectors thereof with such information being effective upon application of a high to the base of these transistors.

It will be understood by those skilled in the art that the above described detailed embodiment is meant to be merely exemplary and that it is susceptible to modification and variation without departing from the spirit and scope of the invention.

What is claimed is:

1. A memory system with a storage capacity of a plurality of words with each word having the same number of bits comprising a plurality of memory cells arranged by words and bits with one and only one memory cell corresponding to each bit of each word, each of said memory cells comprising a pair of cross-connected transistors having a first and a second stable state, each of said cells including (1) a first switching transistor having its collector directly connected to a first of said cross-connected transistors and (2) a second switching transistor having its collector directly connected to a second of said cross-connected transistors, a differing word select line for each of said words, means connecting each word select line to the bases of said first and second switching transistors of its associated memory cells, driver means for applying only to one word select line at any one time a forward biasing signal to the switching transistors of the cells associated with a selected word, a plurality of pairs of data lines with each pair associated with all of the bits in a different bit number position, means connecting the emitter of each first switching transistor to a first of its associated pair of data lines and the emitter of each second switching transistor to the second of its associated pair to apply the potentials produced at their respective cross-connected transistors to their associated data lines, read-write control means for each of said pair of data lines, means for applying write in data to each of said read-write control means for producing a reference signal at one line only of each pair of data lines thereby to tend to switch the stable state of the cell associated with a selected word, each read-write control means including a first and a second gate, write command means connected to one input of each of said first and second gates of each read-write control means and operable for enabling said gates during read out of data, and each read-write control means including a connection between said first data line and another input of said first gate and a connection between said second data line and another input of said second gate to produce read out outputs from said first and second gates indicative of the stable state of the associated memory cell of a selected word.

2. The memory system of claim 1 in which there is provided a data terminal and a complementary data terminal, a first transistor having its collector connected to said data terminal and its base connected to the output of said second gate, a second transistor having its collector connected to said complementary data terminal and its base to the output of said first gate whereby there is produced at said data and complementary data terminals signals indicative of the stable state of an associated memory cell in a selected word.

3. The memory system of claim 2 in which there is provided for each read-write control means a first and a second NAND gate having outputs connected respectively to said first and said second data lines, a source of clock signals connected to one input of each of said NAND gates, and each read-write control means including means connecting said data and complementary data terminals respectively to another input of said first and second NAND gates whereby said first write in information may be applied to said data and complementary data input terminals thereby to tend to switch the stable state of the cell associated with a selected word.

4. A memory system comprising, a plurality of memory cells with one and only one memory cell corresponding to each bit of each word, each of said memory cells comprising a pair of cross-connected transistors having a first and a second stable state, each of said cells including (1) a first switching transistor having a first terminal directly connected to a first of said cross-connected transistors and (2) a second switching transistor having a first terminal directly connected to a second of said cross-connected transistors, a plurality of select line means being connected to input terminals of said first and second switching transistors of a group of memory cells, driver means for applying only to one select line means at any one time a forward biasing signal to turn on the switching transistors of the cells associated with a selected group, a plurality of pairs of data lines with each pair associated with a different group of cells, means connecting a second terminal of each first switching transistor to a first of its associated pair of data lines and a second terminal of each second switching transistor to the second of its associated pair to apply the potentials produced at their respective cross-connected transistors to their associated data lines, read-write control means for each of said pair of data lines, means for applying write in data to each of said read-write control means for producing a reference signal at one line only of each pair of data lines to tend to switch the stable state of the cell associated with a selected word, each read-write control means including a first and a second gate, write command means connected to one input of each of said first and second gates of each read-write control means and operable for enabling said gates during read out of data and for disabling said gates during write in of data, each read-write control means including a connection between said first data line and another input of said first gate and a connection between said second data line and another input of said second gate to produce read out outputs from said first and second gates indicative of the stable state of the associated memory cell of a selected word during data read out.

5. The memory system of claim 4 in which there is provided a data and a complementary data terminal, a first transistor having its collector connected to said data terminal and its base connected to the output of said second gate, a second transistor having its collector connected to said complementary data terminal and its base to the output of said first gate, whereby there is produced at said data and complementary data terminals signals indicative of the stable state of an associated memory cell in a selected word.

6. The memory system of claim 5 in which there is provided for each read-write control means a first and a second NAND gate having outputs connected respectively to said first and said second data lines, a source of clock signals connected to one input of each of said NAND gates, and each read-write control means including means connecting said data and complementary data terminals respectively to another input of said first and second NAND gates whereby upon write in of data said read-write control means is operable to disable said first and said second gates and write in data may be applied to said data and complementary data terminals thereby to tend to switch the stable state of the cell associated with a selected word in accordance with said write in data.

References Cited

UNITED STATES PATENTS

| | | | |
|---|---|---|---|
| 3,218,613 | 11/1965 | Gribble et al. | 340—173 |
| 3,284,782 | 11/1966 | Burns | 340—173 |

TERRELL W. FEARS, Primary Examiner

HOWARD L. BERNSTEIN, Assistant Examiner

U.S. Cl. X.R.

307—215, 291